United States Patent [19]

Tuck

[11] 4,384,774
[45] May 24, 1983

[54] MEANS AND METHOD FOR THE CONVERSION OF A CONVENTIONAL CAMERA FROM FULL-FRAME TO HALF-FRAME FORMAT

[76] Inventor: Robert M. Tuck, P.O. Box 37160, Cincinnati, Ohio 45222

[21] Appl. No.: 183,961

[22] Filed: Sep. 3, 1980

[51] Int. Cl.³ .............................................. G03B 1/50
[52] U.S. Cl. .................................... 354/159; 354/203
[58] Field of Search ............... 354/159, 125, 354, 111, 354/203, 222

[56] References Cited

U.S. PATENT DOCUMENTS

| | | | |
|---|---|---|---|
| 1,556,868 | 10/1925 | Murray | 354/159 |
| 1,913,912 | 6/1933 | Baldeweg | 354/159 |
| 2,210,988 | 8/1940 | Shelton | 354/159 |
| 3,112,683 | 12/1963 | Powers et al. | 354/218 X |
| 3,635,137 | 1/1972 | Pollard | 354/203 |
| 3,678,834 | 7/1972 | Melillo | 354/159 |
| 3,685,423 | 8/1972 | Dahlgren | 354/241 |
| 3,748,737 | 7/1973 | Duff et al. | 30/358 |
| 3,868,703 | 2/1975 | Ueda | 354/49 |
| 3,899,791 | 8/1975 | Kerr | 354/200 X |
| 4,034,393 | 7/1977 | Goldmacher | 354/354 |

*Primary Examiner*—John Gonzales
*Attorney, Agent, or Firm*—Frost & Jacobs

[57] ABSTRACT

Means and a method are disclosed by which a conventional camera can be converted from its usual full-frame format to a half-frame format. The conversion means comprises a mask removably locatable within the camera body directly forward (i.e. facing the lens rear surface) of the film in the camera, and having a window therein centrally located with respect to that aperture in the camera body defining the full-frame image format. The mask window is properly sized to provide a half-frame image format, effecting a 50% reduction in the exposed image area, by blocking quarter frame areas of the camera body aperture at either end thereof. The mask is preferably bowed rearwardly against the film's emulsion surface, so as to bias the film against the camera pressure plate. The conversion means may also include means to apply indicia to a film leader, cooperating with indicia applied to the inside of the camera body, to assure proper indexing of the film through the camera; means to apply a half-frame reticle to the focusing screen of a view finder assembly; and audible or physical means to assist in preventing complete rewind of the film leader into the film cassette. The mask, or the mask and some or all of the above identified elements, may be packaged as a conversion kit.

In use, the mask is mounted in the camera and a roll of film is loaded, having been properly indexed with respect to the camera sprocket. The film is then advanced in a first pass through the camera, exposing a first set of half-frame image areas on the film, with unexposed half-frame areas located therebetween. The film is thereafter rewound and reloaded, again properly indexed with respect to the camera sprocket, and advanced in a second pass through the camera, exposing a second set of half-frame image areas constituting those alternate unexposed areas.

23 Claims, 13 Drawing Figures

MEANS AND METHOD FOR THE CONVERSION OF A CONVENTIONAL CAMERA FROM FULL-FRAME TO HALF-FRAME FORMAT

TECHNICAL FIELD

The invention relates to means and a method by which a conventional camera can be converted from its usual full-frame format to a half-frame format, and more particularly to such a conversion means and method which requires no modification to the existing camera that is not readily reversible, enabling the camera to be used in its full-frame mode or its half-frame mode, as desired.

BACKGROUND ART

The invention is directed to cameras of the type producing images on photographic film. While the teachings of the present invention are applicable to many types of cameras utilizing various film sizes, for purposes of an exemplary showing, the invention will be described in its application to a conventional, 35 mm, single reflex camera, since such cameras are the most widely used today.

As used herein and in the claims, the term "full-frame" is intended to refer to the film image area and shape for which any given camera is designed. In the conventional 35 mm camera, this full-frame image area constitutes a rectangle 24 mm by 36 mm, with the long dimension of the image area extending in the direction of advance of the film. Generally, 35 mm film is available in cassettes containing lengths of film to nominally provide 20, 36 and (more recently) 72 full-frame image areas or "exposures". Cameras of the type under consideration are usually characterized by the fact that the film advance mechanism is permanently interlocked with the shutter cocking mechanism (and any other necessary functions to be performed in readying the camera for a new exposure).

In recent times, the cost of film has escalated significantly, largely due to the increasing price of metallic silver, a critical constituent of the contemporary light-sensitive emulsion coating on the film's structural base. To the increasing cost of the film there must, of course, be added the corresponding increased cost of processing.

Furthermore, there has recently been an unprecedented proliferation of reasonably priced power winders and motor drives. Both types of devices enable the rapid advancement of film through the camera. The difference between power winders and motor drives is primarily a matter of convenience and versatility. Motor drives are generally more sophisticated, providing more modes of operation and higher "framing" rates (typically 5 to 6 frames per second as opposed to 1.5 to 2 frames per second for power winders). While these devices have become quite popular, they generally result in a large increase in the amount of film used, adding considerably to the cost of taking pictures. For example, when a motor drive having a firing rate of 5 or more frames per second is used, a 36 exposure film cassette can be exposed in less than 8 seconds. Heretofore, the only recourse has been to use a bulk film back fitted on the camera, holding 250 full-frame exposures on roughly 33 feet of film. Such equipment is quite expensive, is available for only a very few camera models, and adds considerably to the weight and bulk of the camera. More recently, as indicated above, a roll of 72 exposure 35 mm film in a conventional sized film cassette as been made available, by utilizing an extremely thin 3 mil film base.

The conversion means and method of the present invention enable a conventional 35 mm full-frame camera to produce half-frame images. As used herein and in the claims, the term "half-frame" refers to a film image area and shape constituting ½ of a full-frame image. The present invention enables a conventional camera to produce at least twice as many exposures as presently designated for a given length of film. Thus, on a conventional 36 exposure 35 mm film, from 72 to 76 exposures can be produced. Similarly, on a 72 exposure 35 mm film from 144 to 150 exposures can be obtained. As a result, the photographer is free to concentrate on his subject, composition, etc with less worry about running out of film. While not intended to be so limited, it will be immediately apparent that the conversion means and method of the present invention are particularly advantageous when applied to a camera having a power winder or motor drive. This is true without having to add to the weight or bulk of the camera. The camera, modified in accordance with the present invention, feels, appears and handles exactly as it does in its unmodified condition. The invention circumvents the interlocked film advance and shutter cocking mechanisms without necessitating alterations or modifications in these basic mechanisms.

For those interested in taking a lesser number of pictures, a conventional 20 exposure film will yield from 40 to 44 exposures. Many individuals prefer to purchase film in bulk, and load their own cassettes. Under these circumstances, the choice of number of photographs is virtually unlimited. For example, a "bulk" loaded length of film equivalent to 12 full-frame exposures, will yield from 24 to 28 half-frame exposures.

The invention not only results in the saving of film and processing chemicals, but also in the correlative reduction of pollution, resulting from improper disposal of processing chemicals, often by the increasing number of individuals doing their own processing.

The half-frame image differs from the full-frame image in more than just area. The long dimension of the half-frame image is oriented perpendicularly to the long dimension of a full-frame image. Significantly, the aspect ratio (ratio of the short dimension to the long dimension) of the half-frame image differs considerably from the aspect ratio of the full-frame image. With conventional 35 mm film, a half-frame image is 18 mm by 24 mm. Thus the aspect ratio of a half-frame image is 3:4. This is much closer to the aspect ratios of standard printing paper formats (generally 4:5) and the 1:1 aspect ratio of standard square projection screens.

A full-frame image has an aspect ratio of 2:3. When a full-frame image is enlarged to fully cover a standard 8"×10" sheet of printing paper 17% of the image is cropped. Similarly, when a full-frame image is projected so that its long dimension matches the width of a square projection screen, ⅓ of the screen remains dark and unused.

On the other hand, when a half-frame image is enlarged to fully cover a standard 8"×10" sheet of printing paper, less than 6% of the image is enlarged so that its long dimension fills a conventional square projection screen, only 25% of the screen is left dark. Thus it can be seen that the half-frame format is more efficient both in printing and projecting.

Heretofore, prior art workers having devised so-called "half-frame cameras". These are cameras utilizing standard 35 mm film and producing thereon a plurality of consecutive, side-by-side, half-frame images. The lenses for such cameras are tailored for the half-frame image, and the film advance mechanism is designed to advance the film ½ frame per actuation. When compared to then-contemporary full-frame cameras, these half-frame cameras were more compact and lighter in weight. They were characterized by all of the advantages thus far enumerated.

Nevertheless, through technological advance and the use of new materials, present day full-frame 35 mm cameras are comparable in compactness and weight to the earlier half-frame cameras. Half-frame cameras are not in wide-spread use today, although the formats intrinsic superiority is still being extolled.

The conversion means and method of the present invention has a number of advantages not found in the so-called half-frame cameras. First of all, since the conversion of a camera to expose half-frame images in accordance with the present invention requires no primary mechanical modification of the camera and is readily reversible; the camera may be used either in its full-frame mode or its half-frame mode.

In the prior art as applying to so-called "half-frame"mm cameras, both the camera and its lens are tailored to expose half-frame images. Thus, in such cameras, the half-frame image is indeed a full-frame image for that camera. This is true because, by the definition of "full-frame" above, the half-frame image area and shape are those for which the camera was originally designed. In predominent lens designs, optical performance tends to degrade as one proceeds radially outwardly from the lens axis toward the image periphery. In accordance with the teachings of the present invention, a conventional camera is converted in such a way that a half-frame image is produced, located centrally with respect to the normal full-frame image for which the camera was designed. Taking a conventional 35 mm single lens reflex camera as an example, 90% of the centrally positioned half-frame image lies within a locus defined by a 12 mm radius circle, centered on the lens axis. This 12 mm distance is equal to the distance from the lens axis to the near edge of the full-frame format. As a result, nearly optimum lens performance (resolution and contrast, lack of a variety of distortions, and minimal fall-off in illumination at the half-frame format corners) is achieved over the entire half-frame format.

The optimization of lens performance over the centrally positioned half-frame image area, together with the greater efficiency achieved in printing and projecting, easily offsets the effect of a physically smaller image area, while simultaneously providing at least more than double the number of photographic images for any given length of film.

For those cameras provided with focal plane shutter curtains travelling laterally (in the direction of film advance), an improvement in focal plane shutter speed accuracy and evenness of exposure across the film is achieved. This is true since the effects of acceleration and deceleration of each of the two shutter curtains, at their respective limits of travel, are minimized, since they will occur well to either side of the laterally reduced plane of the half-frame exposure.

As will be described hereinafter, the mask of the present invention may be so configured and made of such material, that it can be used to aid in stabilizing and flattening the film at the focal plane. Improved film flatness during exposure, increases image sharpness (i.e. resolution of detail on the film), as well as reducing the tendency on the film's part to oscillate in a mode analogous to a partially supported and often rapidly moving ribbon. Equally important, however, is the fact that there will be a smaller likelihood that perturbations of the film, during rapid motorized advance, could cause sufficient misalignment of the film's sprocket holes relative to the camera sprocket teeth, as to result in tearing of the film at the sprocket holes, or even jamming during such rapid advance by a winder or motor drive. It will be understood, that such stabilization and flattening of the film is even more advantageous when using the very thin base 72 exposure film.

Yet another advantage of the practice of the present invention, may be described as focal length parity. The concept of using differing focal lengths in order to achieve the same effective angle of view for different image formats, is based upon the fact that most camera lenses are designed in such a way that the image circle that camera lens produces at the focal plane, just covers the corners of the format for which the camera was designed. Thus, the major diagonal of the format is substantially equal to the diameter of the circular image at the plane of focus. This is primarily true for those cameras wherein the central optical axis remains fixed relative to the image format.

Since the present invention contemplates means and a method for the conversion of a conventional full-frame camera to a half-frame format, the focal lengths of lenses used with the camera (yielding relative designations as wide angle, normal and telephoto) will remain the same for either mode of use of the camera. Such parity would not be the case when comparing a conventional 35 mm camera to a prior art half-frame camera (designed for the half-frame format utilizing 35 mm film). In the latter camera, the image circle diameter at the plane of focus is substantially equivalent to the major diagonal of the half-frame format since, as has been stated above, the half-frame format is indeed the full-frame format for which such cameras were designed.

DISCLOSURE OF THE INVENTION

The means and method of the present invention are directed to the conversion of a conventional camera from its usual full-frame format to a half-frame format, without necessitating any mechanical changes in the camera and its film advance mechanism (or the shutter cocking mechanism and any other systems interlocked with the film advance mechanism). The conversion means comprises a mask, locatable within the camera body, directly forward (i.e. towards the lens rear surface) of the film in the camera, having a window therein centrally located with respect to that aperture in the camera body defining the full-frame image format. The mask window is properly sized, so as to provide a half-frame image format; effecting a 50% reduction in the exposed image area. This is accomplished by blocking quarter frame areas of the camera body aperture at either end thereof. If conversion of the camera is intended to be permanent, the mounting of the mask within the camera body may then also be permanent. Preferably, however, the mask is so mounted within the camera body as to be readily removable therefrom, permitting use of the camera either in its full-frame mode or its half-frame mode, as desired.

The mask is preferably bowed so as to bias the film within the camera against the pressure plate of the camera. As indicated above, this not only aids in stabilizing and flattening the film at the focal plane, but also greatly reduces or eliminates the possibility of tearing or jamming of the film; particularly during occasion of rapid advance through the camera by means of a power winder or motor drive.

For reasons which will be more fully explained hereinafter, the film is advanced through the camera in a first pass, and is then rewound and advanced through the camera in a second pass. To assure proper location (i.e. indexing) of the exposed images on the film, during the first and second pass through the camera, it is necessary to engage a specifically delineated sprocket hole in the film leader with a specifically registered camera sprocket tooth during initial loading of the film in the camera. In order to properly align the film for the second pass of the film through the camera, a second clearly delineated sprocket hole in the film leader (there being three sprocket holes separating the two specially delineated holes) is engaged with a camera sprocket tooth, specifically in the same register as for the first pass. While not completely necessary if one is fully familiar with the teachings of the present invention, it is nevertheless desirable and preferable to provide indicia on the film leader, to aid in correctly identifying the two specifically delineated leader sprocket holes, which are to be used in the critical indexing of the film for the respective first and second passes that it must make through the camera. While such indicia may be applied in any convenient manner the present invention teaches a device for punching a single hole in the film leader above that sprocket hole being used for identifying relative film position preparatory to its first pass through the camera. The device simultaneously punches a pair of holes above that sprocket hole being used for proper indexing of the film for its second pass through the camera. The punched holes serve as visual indicia for identifying the above note first and second individual sprocket holes, to be used in accurately loading and reloading the film for its two passes through the camera. The device may also slightly upset the film leader at the position of the holes, so that the indicia will not only be visual, but also tactile, helpful when the camera is loaded in conditions of unusually dim light.

In some cameras, the film take-up reel is so configured that it is necessary to crop a small portion of the film leader, prior to loading of the film for its second pass through the camera. The indicia-applying device may be provided with means to perform or assist in such cropping of the leader.

Again, as a matter of considerable convenience, the present invention teaches means and methods for applying a half-frame retical to the focusing screen of a viewfinder assembly. The retical may be of various configurations.

Since, in accordance with the method of the present invention, the film is advanced through the camera in two passes, it is preferable that upon rewinding the film after the first pass, the film leader not be rewound into the cassette. If this occurs, there are some barely adequate expedient means, and at least one commercial device for retrieval of the leader. Some power drive systems for cameras are specially designed to prevent rewind of the leader portion of the film into the film cassette. In the absence of such means, it is advisable, when practicing the teachings of the present invention, to rewind the film by hand. Frequently, when the operator is familiar with his camera, he can audibly or tactilly discern that point at which the leader detaches from the film take-up spool. The present invention also contemplates a simple means which may be applied to the camera pressure plate, that will provide a signally improved audible and tactile indication to the user, that the leader portion of the film has reached the point wherein it disengages from the camera take-up spool, enhancing the operator's ability to stop manual rewind, with the most convenient and advantageous timing.

The mask of the present invention alone, or preferably in combination with any or all of the above described additional devices, may be packaged as a conversion kit.

In the practice of the method of the present invention, the mask is installed in the camera; the half-frame retical (if used) is applied to the focusing screen portion of the view finder assembly; and the rewind indicator (if used) is applied to the camera pressure plate. The camera is now ready for half-frame operation.

Preferably, both the film leader and the camera body have been marked with indicia, as described above. Before the film is actually loaded into the camera, it is necessary to assure that the camera sprocket is securely clutched with the take up spool. This can be accomplished in several ways, depending upon the make and model of camera. Most simply, the advancing mechanism of the camera can be twice actuated and the shutter twice tripped. This will assure that the camera sprocket and take up spool are clutched. The film is then loaded into the camera, with the first indicated sprocket hole engaged with that tooth of the camera sprocket which is registered at a preselected position with respect to the camera body. The film is then conventionally advanced through the camera, taking pictures until the end of the film is reached. This procedure exposes a plurality of half-frame areas on the film, with alternate unexposed half-frame areas located therebetween. In this way the first pass of the film through the camera is completed.

To accomplish the second pass of the film through the camera, the procedure above described is repeated, with the exception that the second designated sprocket hole on the leader is engaged with a camera sprocket tooth identically registered as above noted; steps having again been taken to assure that the camera sprocket and the take-up reel are securelyclutched together, and that a sprocket tooth is lined up at the above-mentioned preselected position. The film is thereafter advanced through the camera on its second pass. During the second pass, those unexposed half-frame areas located between the previously exposed half-frame areas are, themselves, exposed. Upon completion of this second pass, the film is rewound into its cassette, and removed for processing.

BRIEF DESCRIPTION OF THE DRAWINGS

FIG. 6 is a fragmentary, semi-diagrammatic view of the leader end of a film, after it has made its first pass through the camera.

FIG. 7 is a fragmentary, semi-diagrammatic view, similar to FIG. 6 and illustrating the leader end of the film of FIG. 6, after its second pass through the camera.

BEST MODE OF CARRYING OUT THE INVENTION

Figure 1:
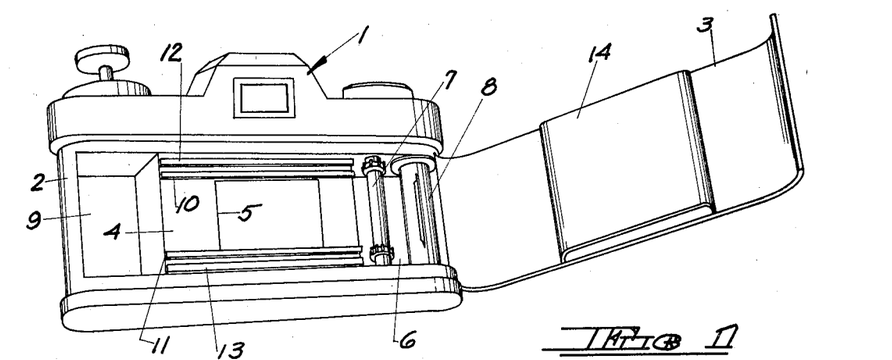
FIG. 1 is a perspective view of the rear of a conventional 35 mm full-frame camera with its back in an open position.

As indicated above, for purposes of an exemplary illustration, the invention will be described in its application to a conventional, full-frame, 35 mm, single-lens-reflex (SLR) camera, utilizing a focal plane shutter. Reference is first made to FIG. 1 wherein such a camera is illustrated. The camera is generally indicated at 1, having a body 2 and an openable back 3, shown in its open position. Within the body 2, the camera has a rectangular shutter housing 4, with an aperture 5 formed therein, and constituting the full-frame aperture of the camera.

To one side of shutter housing 4 there is a chamber 6 in the camera body containing the sprocket guide roller 7, and the film take-up reel 8. As film is advanced through the camera, the camera sprocket 7 and take up reel 8 are clutched together, as is well known in the art. During film rewind operations, means (not shown) are provided to declutch the sprocket 7, from take up reel 8. On the other side of shutter housing 4, there is a chamber 9, adapted to receive a film cassette.

Mounted on shutter housing 4, there is a first pair of rails 10 and 11, constituting film guide rails. A second pair of rails 12 and 13 are mounted on the shutter housing 4, outside of and parallel to the rails 10 and 11. The rails 12 and 13 are pressure plate locating rails. The camera is provided with a pressure plate 14, mounted on the camera back 3, by spring mounts (not shown), adapted to urge pressure plate 14 away from camera back 3. When the camera back is in its closed position, pressure plate 14 is urged into abutting relationship with pressure plate rails 12 and 13.

As film is advanced through the camera, it rests upon and is supported by the film guide rails 10 and 11. The film is of such width as to fit within pressure plate rails 12 and 13 and to some extent be guided vertically thereby, the rails 12 and 13 acting in conjunction with pressure plate 14.

Figures 2, 3:
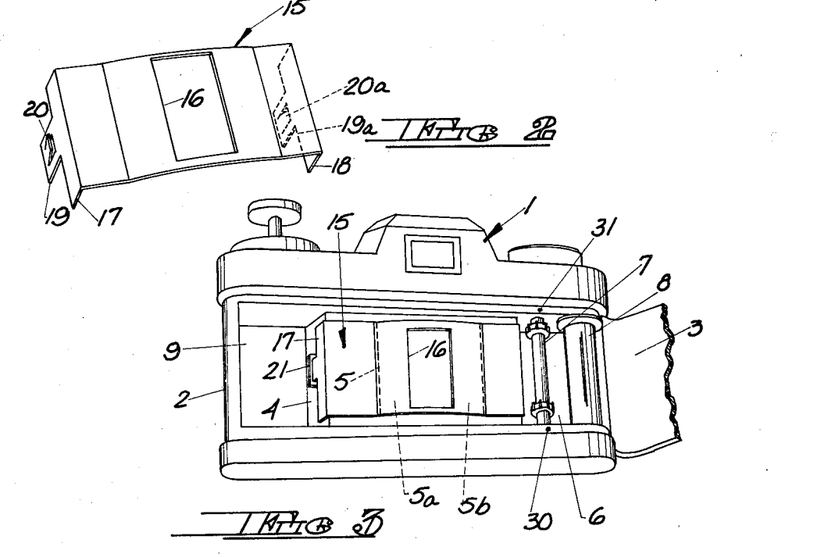
FIG. 2 is a perspective view of the mask of the present invention.
FIG. 3 is a fragmentary perspective view, similar to FIG. 1, and illustrating the mask of FIG. 2 in mounted position.
Figure 3:
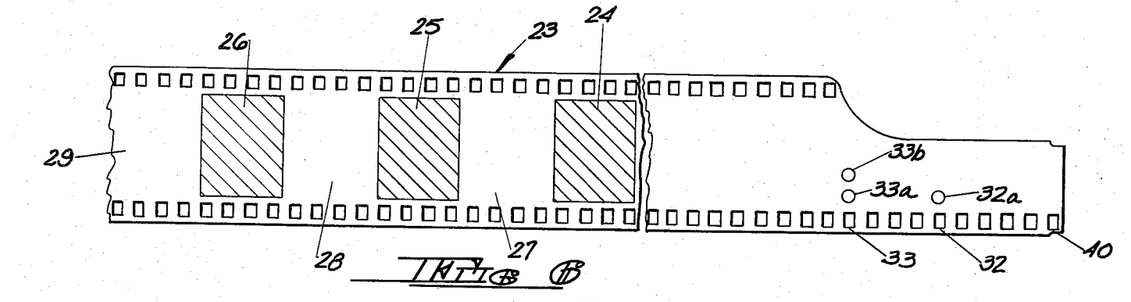

FIG. 2 illustrates the mask of the present invention. The mask is generally indicated at 15 and comprises an elongated member, having a length substantially equal to the length of shutter housing 4. At a point corresponding to the center of the full-frame film aperture, the mask 15 has an opening 16 formed therein. The opening 16 constitutes the half-frame aperture, and as viewed in FIG. 2, it has a vertical or long dimension of about 24 mm and a width of about 18 mm. The mask 15 is of such width that it just nicely fits between film guide rails 10 and 11, on shutter housing 4.

If it is desired that the conversion of camera 1 to a half-frame camera be permanent, the mask 15 may be affixed to the back of shutter housing 4 in any appropriate fashion as by adhesive means or the like, consistant with the various extremes of the camera design parameters. Preferably, however, the mask is readily affixable to and removable from the back of shutter housing 4, so that camera 1 can be used in either its full-frame mode, or its half-frame mode. Removable mounting of mask 15 to the back of shutter housing 4 can be accomplished in any appropriate manner. For purposes of an exemplary showing, the mask 15 is illustrated as terminating at its ends in downwardly depending flanges 17 and 18. The flange 17 has a central coplanar extension 19 constituting a downwardly depending leg. An inverted U-shaped cut is made in leg 19, so as to form an outwardly-extending tine 20. As will be further described hereinafter, the mask 15, including tine 20, is preferably made of a resilient material. The flange 18 has a downwardly depending extension, or leg, 19a and tine 20a similar to leg 19 and tine 20.

Figure 4:
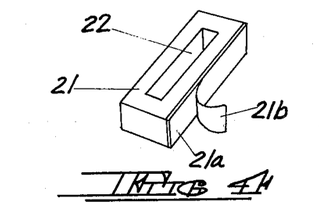
FIG. 4 is a perspective view of a socket member, utilized to removably affix the mask within the camera.

FIG. 4 illustrates a socket 21 for receipt of leg 19. The socket 21 has a slot 22 formed therein. The slot 22 is of such length as to receive leg 19 of mask flange 17. It will be understood that a similar socket will be provided for the leg 19a of flange 18.

Figure 5:
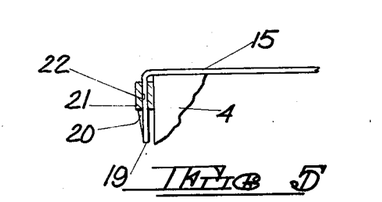
FIG. 5 is a fragmentary elevational view, partly in cross section, illustrating the engagement of the mask of FIG. 2 in the socket of FIG. 4.

FIG. 3 illustrates mask 15 mounted on shutter housing 4. Socket 21 is affixed to the side of the shutter housing and mask flange 17 extends downwardly along the side of shutter housing 4 with leg 19 engaged in socket 21. This is shown in FIG. 5, wherein like parts have been given like index numerals. As leg 19 is inserted into socket slot 22, tine 20 will be flattened until its upper edge clears slot 22, whereupon it will lock mask 15 in place against shutter housing 4. It will be understood that the leg 19a and tine 20a of flange 18 will cooperate in a similar manner with a socket (not shown), identical to socket 21 on the other end of shutter housing 4.

The manner in which socket 21 is affixed to the end of shutter housing 4, again, does not constitute a limitation on the present invention. For purposes of an exemplary showing, socket 21 in FIG. 4 is illustrated as having a coating of adhesive 21a covered by a protective release sheet 21b. Socket 21 can be mounted to the side of shutter housing 4 by simply removing release sheet 21b and pressing socket 21 against the shutter housing side with the adhesive side 21a of the socket abutting the shutter housing side. While this can be accomplished with care prior to mounting the mask 15, a simple way to assure proper location of the sockets is to first mount them on mask 15. Thereafter, the release paper is removed from each socket and the mask is located in place on the shutter housing 4. The sockets are then pressed against the shutter housing sides, in order to adhesively affix them thereto. To release the mount from its sockets, it is only necessary to depress tine 20, so that it can pass through slot 22 of socket 21. The tine 20a on the other leg 19a of mask 15 is similarly flattened, so that that leg 10a can be removed from its respective socket.

It will be understood by one skilled in the art, that not all cameras are identical in dimensions and internal and external configuration, with the result that it will be necessary to tailor the mask 15 for the particular camera and model with which it is to be used. For example, some cameras do not have a shutter housing of the type shown at 4 in FIGS. 1 and 3. The important thing is that the mask 15 be mounted within the camera (preferably in a removable manner) directly forward of the film in the camera.

The mask 15 may be made of any appropriate durable and resilient material such as plastic, metal or the like; it must, however, be opaque. Overall parameters are such that a mask thickness of 0.010 inch (10 mils) or less, would be of prime consideration unless the specific feature of bowing the mask is eliminated. Excellent results have been achieved with a mask made of 4 mil aluminum.

In the usual camera design, when the pressure plate is in abutment with the pressure plate rails 12 and 13, the film guide rails 10 and 11 are spaced from the pressure plate by about 0.008 inch (8 mils). Most 35 mm color and black and white film have an average thickness of about 0.006 inch (6 mils). The new 72 exposure film has a base thickness of about 0.003 inch (3 mils) and an overall thickness with its emulsion coating of about 0.0035 inch (3.5 mils). Thus it can be seen that the cross-sectional delimitation of space through which the film advances within the camera (between the pressure plate and the film guide rails), will have a clearance for the film ranging between 0.002 inch (2 mils) and 0.0045 inch (4.5 mils).

This slack or clearance between the film and the pressure plate, can be largely eliminated by means of mask 15. To this end, the central portion of mask 15, containing aperture 16, is preferably bowed rearwardly (i.e. away from shutter housing 4 and toward pressure plate 14). An amount of bow in the range of about 0.008 inch to about 0.012 inch (from about 8 mils to about 12 mils) has achieved excellent results. In this way, mask 15 can be used to flatten the film against pressure plate 14, without causing jamming of the film. Again, with proper choice of the mask's material, thickness and elastic Modulus, the length and height of the bowed portion of the mask could be more precisely tailored to complement differing camera body parameters. Flattening of the film at the focal plane, as mentioned above, will not only increase image sharpness, but also will aid in stabilizing of the film, to help prevent jamming or tearing of the at the sprocket holes, as when a power winder or motor drive is used. That surface of mask 15 which faces the film should be smooth, so as not to damage the film emulsion. This can be accomplished in a number of ways, including polishing and or the provision of an antifriction coating. By the same token, the edges of aperture 16 should be smoothly radiused and free of burrs.

Returning to FIG. 3, the camera aperture 5 is shown in broken lines. It will be immediately evident that mask 15 blocks quarter frames 5a and 5b of aperture 5. As a result, the portions of the mask blocking quarter frames 5a and 5b are exposed to the lens. Therefore, the inside surface of mask 15 is preferably provided with a non-reflective matte black finish, in order to minimize the effects of internal reflection within the camera body.

There are some cameras which are so designed that the exposure is controlled directly by light reflected from the film emulsion surface (and/or specially patterned shutter curtains, for exposures of very short duration). In such an instance, the inside surface of mask 15, or at least those portions blocking quarter frames 5a and 5b should be provided with a surface finish approximating an "average" film emulsion surface in reflectivity. Tailoring for various makes and models may again be necessary here.

Reference is now made to FIG. 6, wherein the leader end of a film is shown; the film being generally indicated at 23. It will be remembered, as stated above, that present standard practice generally interlocks the film advance mechanism inextricably with the shutter cocking mechanism (and any other necessary functions to be performed in readying the camera for a new exposure). A critical facet of the present invention lies in the fact that it circumvents the interlocked film advance and shutter locking mechanisms, without necessitating alterations or modifications in these basic mechanisms.

Since mask 15 covers quarter frame areas 5a and 5b of the camera aperture 5 (see FIG. 3), it will be evident that if a film is advanced through the camera in a normal manner, half-frame areas of the film will be exposed with unexposed half-frame areas of the film located therebetween. FIG. 6 illustrates film 23 after having made a first pass through the camera. Three of the exposures on the film are shown at 24, 25 and 26. Each exposure is followed by an unexposed half-frame area. Such unexposed areas are shown in FIG. 6 at 27, 28 and 29. It will be understood, that this pattern of alternate exposed and unexposed areas will be repeated throughout the length of the film. The reason for this pattern is two-fold. First of all, mask 15 blocks a quarter-frame area to either side of each of exposures 24, 25 and 26 with the result that each unexposed area (27, 28 and 29), is the equivalent of two quarter-frame areas (i.e. a half-frame area). Secondly, since no change has been made in the film advance mechanism, the film will be advanced a full frame each time.

To take full advantage of the half-frame format, it is necessary to cause the film to make a second pass through the camera in order to expose the previously unexposed areas 27, 28, 29 etc. FIG. 7 illustrates the film 23, of FIG. 6, after its second pass through the camera. The only difference between the film 23 illustrated in FIG. 7, and the film 23 illustrated in FIG. 6, is that the previously unexposed areas 27, 28 and 29 of FIG. 6 have now been exposed (these are delineated at 27a, 28a and 29a). It will be understood that film 23, of FIG. 7, has two half-frame exposures in an area which would normally be occupied by a single full-frame exposure; i.e., if the camera were to have been used in its full-frame mode.

To accomplish the interdigitated first and second pass half-frame exposures illustrated in FIG. 7, it is necessary that the film be properly indexed with respect to the camera as the time of the first pass through the camera, and also at the time of the second pass through the camera. This means that each time the film is loaded in the camera, a specifically designated film sprocket hole must be engaged by a camera sprocket tooth of sprocket guide roller 7, said tooth being located at a pre-selected position with respect to the camera body. The first step is to make sure that the camera sprocket 7 is securely clutched with take-up reel 8. As indicated above, this can be accomplished in several ways (depending upon the make of camera). Most simply, the advancing mechanism of the camera can be twice actuated, and the shutter twice tripped. The sprocket tooth with which the film should be engaged, should be that tooth most easily accessible. For example, that sprocket tooth facing most nearly rearwardly with respect to the camera might be selected, depending upon the camera used. It is recommended that marks to be made on the camera body, in registration with such a preselected tooth and its counterpart at the other end of sprocket guide roller 7. The marks may be made in any appropriate manner and such marks are indicated at 30 and 31 in FIG. 3. The application of such indicating marks 30 and 31 is recommended, since in most instances, the same set of sprocket teeth will not necessarily occupy that position, each time, but there will always be one set of sprocket teeth in that position, the specific procedures detailed for any given camera design being properly followed. The lower one of those sprocket teeth in that position, will hereinafter be referred to as the "designated sprocket tooth". In FIG. 3, the sprocket tooth aligned with mark 30, constitutes said designated sprocket tooth. Having made mark 30 on the camera body, the sprocket tooth adjacent to that mark will always constitute the designated sprocket tooth.

The next step is to properly register the film with respect to the designated sprocket tooth, and this must be done for each pass of the film through the camera. With respect to the first pass of the film through the camera, substantially any sprocket on the film leader can be used, so long as the proper engagement of the film leader with take-up reel 8 is accomplished. Various cameras and camera models have considerable variation in the take-up reel configurations with which the film leader is to be engaged. In general, to achieve maximum efficiency (i.e., the maximum number of exposed images per length of film), it is desirable to specify for the first pass, the nearest sprocket hole to the film leader's end that will assure secure engagement of the film on take up reel 8, when said hole is properly registered with the designated sprocket tooth. Just which sprocket hole of the film is used for the first pass of the film through the camera, will depend on the camera used, but for many cameras it has been found that the 6th sprocket hole from the free end of the leader (indicated at 32 in FIGS. 6 and 7) can be applied to the designated sprocket tooth while also achieving a secure attachment of the film leader to take up reel 8. After sprocket hole 32 is engaged with the designated sprocket tooth, and the film is advanced through the camera, it will have exposures made thereon as illustrated in FIG. 6. Sprocket hole 32 may, for purposes of this description, be considered the "first designated sprocket hole".

For the second pass of film 23 through camera 1, it is necessary to utilize what may be termed the "second designated sprocket hole", for engagement with the designated sprocket tooth. While selection of the first designated sprocket hole is a matter of choice, reliability and the camera being used, this is not true of the second designated sprocket hole. In the exemplary embodiment illustrated herein, utilizing 35 mm film in a conventional 35 mm camera, the second designated sprocket hole (for the second pass of the film through the camera), must always be separated from the first designated sprocket hole by 3 intermediate sprocket holes. In other words, in such an instance the second designated sprocket hole must be that hole which is four removed from the first designated sprocket hole. The second designated sprocket hole is illustrated at 33 in FIGS. 6 and 7. When the designated sprocket tooth is located in register with the second designated sprocket hole, and the film is advanced in its second pass through the camera, a fully exposed film composed of half-frame images, as illustrated in FIG. 7 is achieved.

Figures 8, 9, 10, 11, 12:
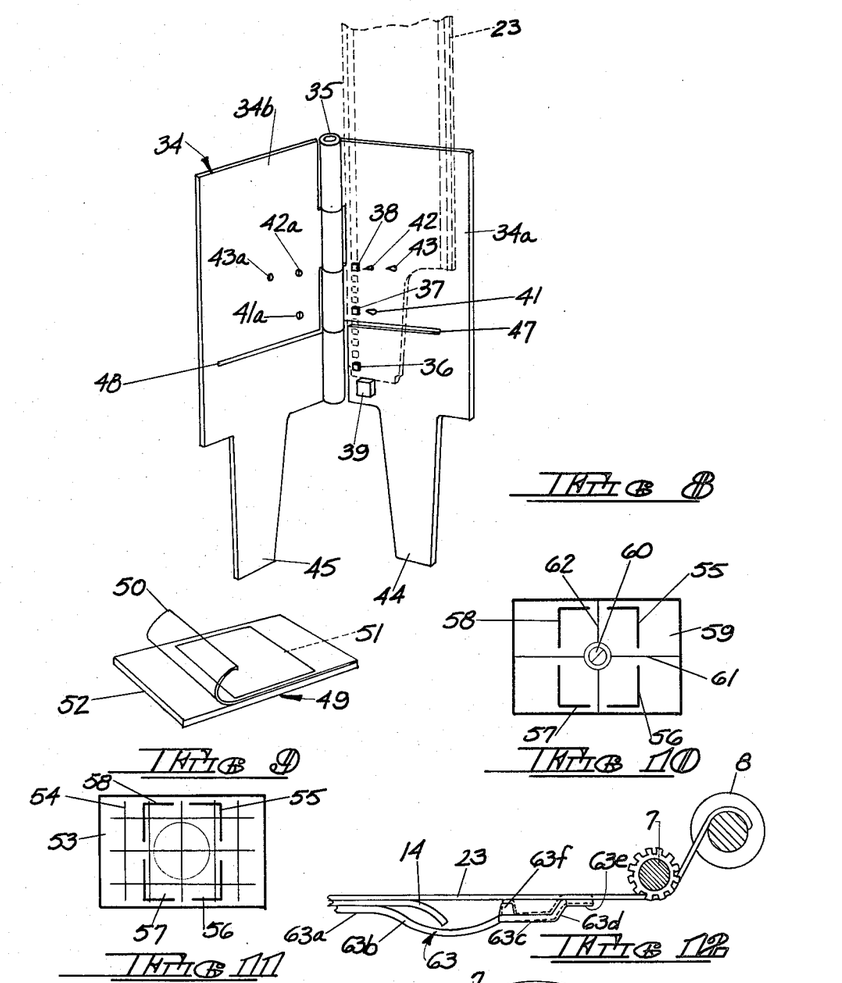
FIG. 8 is a perspective view of a punching tool for marking the leader of a film, to assure proper indexing of the film for each of the two passes through the camera.
FIG. 9 is a perspective view of a dry transfer, used to apply a half-frame retical to the focusing screen of a viewfinder assembly.
FIGS. 10 and 11 are bottom views of viewfinder assembly focusing screens with two important variations of half-frame retical configurations, as applied thereto.
FIG. 12 is a fragmentary, semi-diagrammatic view, of a warning means to prevent rewind of the leader portion of the film into the film cassette.

As a matter of convenience, and to preclude error or confusion, it is desirable to provide the leader of film 23 with some sort of indicia, clearly indicating the first and second designated sprocket holes 32 and 33. While this may be accomplished in any appropriate manner, the present invention contemplates the provision of a punch which will provide a first hole 32a in the film leader, immediately above sprocket hole 32, so as to clearly indicate sprocket hole 32 as the first designated sprocket hole intended to index for the first pass of the film through the camera. Similarly, the punch will provide two holes 33a and 33b immediately above sprocket hole 33, to clearly indicate that it is the second designated sprocket hole for indexing the second pass of the film through the camera. The punch is illustrated in FIG. 8, and is generally indicated by index numeral 34. Again, it will be understood that punch 34 will be designed for the particular film and camera used.

The punch is made up of two halves, 34a and 34b, hinged together as at 35. Punch halves 34a and 34b may be substantial mirror images of each other. Punch half 34a has mounted thereon three film registration pins 36, 37 and 38. A stop-lug is shown at 39. The purpose of these registration pins and the stop-lug is to aid in properly locating the leader end of the film 23 on punch half 34a. In FIG. 8, the leader end of the film 23 is shown in broken lines. Stop-lug 39 is so positioned as to be abutted by the forwardmost edge of the leader. Pins 36, 37 and 38 are so sized, tapered and spaced as to enter the first sprocket hole 40 of the leader, the first designated sprocket hole 32 and the second designated sprocket hole 33 (see FIG. 6). In this manner, the leader end of film 23 is positionable on punch half 34a, with its emulsion surface facing the punch half 34a.

Finally, punch half 34a is provided with a first punch 41 and an additional pair of punches 42 and 43. Punch half 34b has a first perforation 41a formed therein, together with two additional perforations 42a and 43, intended to serve as dies for punches 41, 42 and 43, respectively.

When the leader end of film 23 is mounted on punch half 34a in the manner shown, and the punch halves 34a and 34b are closed upon each other with film 23 therebetween, the punches 41, 42 and 43 will form the indicia holes 32a, 33a and 33b (see FIGS. 6 and 7), respectively, in film 23.

The peripheral configuration of punch 34 does not constitute a limitation on the present invention. For example, punch halves 34a and 34b may be provided with integral handle elements 44 and 45, respectively, to assist in manipulation of the punch. Such handle elements may be located at any convenient position about the periphery of the punch. Punches 41, 42 and 43 and die holes 41a, 42a and 43a may be so configured that the indicia holes 32a, 33a and 33b are clean and substantially free of burrs or rough edges. On the other hand, punches 41, 42 and 43 and die holes 41a, 42a and 43a may be so configured as to not only perforate film 23 but to slightly upset the film at the position of the perforations on its non-emulsion (i.e. uncoated side), so that the indicia holes 32a, 33a and 33b can present both a visual and tactile indication of the first designated sprocket hole 32, and the second designated sprocket hole 33.

As indicated above, various cameras and models thereof, differ in the manner in which the film leader is engaged with the take-up reel. In some systems, when the camera is loaded for the second pass of film 23 therethrough, aligning second designated sprocket hole 33 with the designated sprocket tooth, the length between the second designated sprocket hole 33 and the free end of the leader, is too long to permit convenient and reliable attachment thereof to the take-up spool 8. Under these circumstances, it is necessary to crop the free end of the leader. In many instances, cropping that much of the free end of the leader, which contains four sprocket holes, will be sufficient to enable optimal attachment of the leader to take-up reel 8. A cut-line for such cropping is indicated at 46 in FIG. 7. It will be understood that the position of cut-line 46 may vary, depending upon the nature of take-up reel 8.

While cropping of the free end of the leader can be done by hand, it may also be accomplished with greater precision by means of punch 34. To this end, punch halves 34a and 34b may be provided with elongated, corresponding, transverse slots 47 and 48 which, when the punch is closed with film 23 therein, will overlie the proper position for cut-line 46. A sharp instrument may be inserted in aligned slots 47 and 48, and traversed therein to sever the free end of the leader. The sharp instrument (not shown), may constitute a simple blade, razor blade or the like. It may also be a blade-like element captively affixed to the punch.

As is well known in the art, some cameras do not have sprockets of the type shown at 7 in FIG. 1. Film for such cameras is frequently devoid of sprocket holes. In the use of such cameras, the proper indexing of the film for both passes of the film through the camera is accomplished in much the same way as described above. It is first necessary to make indicia marks equivalent to marks 30 and 31 in the camera body at some convenient position near its take-up reel. In a similar fashion, indicia marks equivalent to indicia holes 32a, 33a and 33b are made on the film. For the first pass, the indicia mark equivalent to indicia hole 33a is aligned with the indicia marks equivalent to marks 30 and 31 within the camera, making sure that all slack and slippage is taken up after the film winding train is fully clutched. The film is then advanced through the camera in the manner described above and rewound. For the second pass, the film is so loaded, that the indicia marks on the film designating holes 33a and 33b, are aligned with the indicia marks in the camera body equivalent to marks 30 and 31; again first insuring that the film winding train is fully clutched. Thereafter, the film is advanced through the camera in its second pass, and rewound for processing. A punch equivalent to punch 34 may be provided for such cameras, requiring modification only of lugs 36, 37 and 38 since there will be no sprocket holes in the film. Other alignment lugs engaging the edge of the film may be provided, and the proper positioning of such lugs is well within the skill of the worker in the art.

In the use of a camera provided with the conversion means of the present invention, it is desirable that the viewfinder assembly having a half-frame reticle, to assist in achieving proper centering and composition of the photographs being taken. The present invention contemplates a quick and inexpensive means for equipping the focusing screen of any given camera viewfinder assembly with a half-frame reticle. To this end, reference is made to FIG. 9.

FIG. 9 illustrates a dry transfer generally indicated at 49. The dry transfer is made up of a protective sheet 50, the transfer 51, itself, in the form of a half-frame reticle and a backing sheet 52.

In some camera models the focusing screen of the viewfinder assembly is readily removable. In other camera models this is not the case. In either circumstance, dry transfer 49 should be properly sized so as to be easily locatable on the underside of the focusing screen, once the protective sheet 50 has been removed therefrom. The adhesive means maintaining the reticle 51 on backing sheet 52 should be carefully chosen such that transfer of the reticle onto the underside of the focusing screen can be accomplished with a minimum of pressure applied by an appropriate rubbing instrument.

The reticle itself may take various configurations. In FIG. 9, reticle 51 is shown as constituting a continuous rectangular boarder. In FIG. 11, a focusing screen 53 with a rectilinear grid 54 thereon, is illustrated. The focusing screen 53 has a half-frame dry transfer reticle mounted thereon in the form of four corner right angle, transfer elements 55 through 58. It will be understood that grid 54 could also be part of the dry transfer, if so desired.

FIG. 10 illustrates a focusing screen 59 providing with a split-image rangefinder 60 plus a pair of cross hairs 61 and 62. To this focusing screen, there is shown applied a dry transfer recticle of the type illustrated in FIG. 11. Again it will be understood that cross hairs 61 and 62 could constitute a part of the dry transfer. The focusing screens 53 and 59 could be provided with an uninterrupted rectangular boarder of the type shown at 51 in FIG. 9, as well as a transparent, structurally supportive overlay, extending over all or part of the focusing screen.

When the focusing screen is changed by the addition of a half-frame reticle or the like, a minute part of the light passing through the focusing screen is blocked. In those cameras which read light from the focusing surface of the finder screen, a small correction may be necessary, to compensate for the light blocked by the reticle. This can be accomplished by raising the indicated ASA index number setting on the camera's meter by an appropriate factor, or by effectively re-setting the ASA index, utilizing an exposure biasing control, provided on some makes or models in the negative direction by a given factor. The specific correction factors to be used, can be provided as part of the overall instructions, supplied with the kit, depending upon the nature and configuration of the camera's metering system, and of dry transfer reticle and any other indicia constituting a part of the dry transfer.

Since the method of the present invention requires that the film be advanced through the camera in two passes, an intermediate rewind step is required. It is highly desirable, as a matter of convenience, that the film leader not be rewound fully into the film cassette during this intermediate rewind step. Should the leader be rewound into the film cassette, there are various methods and at least one commercial means for retrieval of the leader, but such retrieval constitutes an extra, time-consuming and unnecessary step. There are motor drives available for some models of cameras which will rewind the film and automatically stop before the leader enters the film cassette. In the absence of such a device it is recommended that when a power winder or motor drive is used, the film be rewound by hand. Many photographers, familiar with their camera, can sense by sound or touch, when the free end of the leader detaches from the take-up spool 8. However, this is not always the case.

Figure 13:
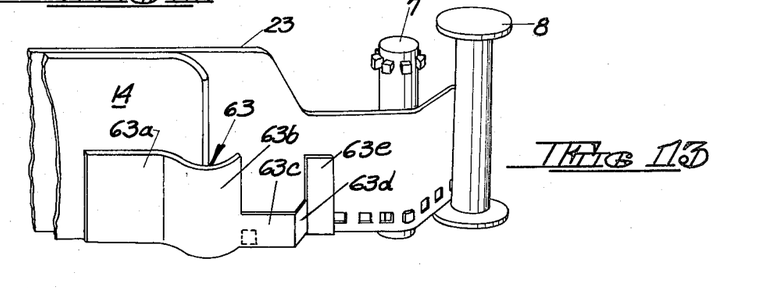
FIG. 13 is a fragmentary, semi-diagrammatic perspective view of the warning means of FIG. 12.

For the reasons given above, the present invention contemplates the provision of means to give an audible or tactile warning to the photographer that the free end of the film leader has detached from the spool 8, in sufficient time to prevent the leader from being fully rewound into the film cassette. Reference is made to FIGS. 12 and 13, wherein like parts have been given like index numerals. Both of these Figures illustrate take-up reel 8, sprocket 7, pressure plate 14 and the leader end of film 23. In these Figures, the free end of the leader portion of film 23 is shown affixed to take-up reel 8. As viewed in FIG. 12, the film 23 is shown passing beneath sprocket 7 and over and about take-up reel 8. In some cameras, the film passes about take-up reel 8 in the opposite direction, but this does not affect the teachings of the present invention.

The warning device is generally indicated at 63. The warning device comprises an elongated member of resilient material, having a first planar portion 63a firmly affixed by adhesive or other means to the rear surface (i.e. that surface opposite the surface contacted by the film 23) of pressure plate 14. The planar portion 63a is followed by an arcuate portion 63b, adapted to clear the rearwardly extending curved edge portion of pressure plate 14. Extending from arcuate portion 63b, there is a substantially planar arm 63c having a portion 63d extending toward the film 23. The portion 63d terminates in a foot 63e, adapted to contact and ride along the rear (non-emulsion coated) surface of film 23.

The warning device 63, is made of relatively thin, resilient material, such as metal, plastic or the like. The portions 63c, 63d and 63e of the warning device normally occupy the position shown in broken lines in FIG. 12. When the film 23 has its leader end engaged with take-up reel 8, foot-portion 63e of warning device 63, is contacted by the rear surface of film 23 and is urged to the position shown in solid lines in FIG. 12. Near the juncture of portions 63b and 63c, the warning device 63 is provided with a small projection or lug 63f. The lug 63f is so sized as to be capable of partially entering the sprocket holes of film 23. Preferably, the lug 63f is of the configuration of a truncated pyramid with its edges rounded so as not to damage the film sprocket holes.

When the warning device 63 is in its position, as shown in solid lines in FIGS. 12 and 13, the lug 63f is slightly spaced from film 23. As soon as the leader-portion of film 23 disengages from take-up reel 8 and sprocket 7 during the rewind step, the portions 63c, 63d and 63e of the warning device will assume their positions shown in broken lines in FIG. 12. As soon as the film clears foot portion 63e, lug 63f will partially enter the last few remaining sprockets, one-after-another, giving a brief audible and tactile warning, enabling manual termination of the rewind procedure prior to complete rewind of the leader-portion of film 23 into the film cassette. Where rewind is always done carefully by hand, the lug 23 could be slightly hook shaped so that when it entered a sprocket hole of the film it would physically block further rewind.

The invention having been described in detail, its method of operation can be set forth as follows: The warning device 63 may be applied to the camera pressure plate, as described, and can simply become a permanent part of the camera, since it will interfere with none of the camera functions in either its full-frame mode or its half-frame mode of operation. Similarly, a half-frame reticle can be applied, as described above, to the focusing screen in the view finder assembly, its presence assisting when the camera is used in its half-frame mode, and will not interfere with operation of the camera when used in its full-frame mode. The film to be used may be indexed by punch 34, as described above, so as to properly indicate the first designated sprocket hole 32, and the second designated sprocket hole 33.

Once the mask 15 has been mounted within the camera, as for example in the manner taught with respect to FIGS. 2 through 5, the camera is ready for half-frame operation. Having made sure that sprocket 7 and take-up reel 8 are securely clutched, the film is then loaded in the camera with the free end of its leader firmly affixed to take-up reel 8, and the first designated sprocket hole 32 of the film engaged with the designated sprocket tooth properly aligned with mark 30 in the camera. The film is then advanced through the camera in a first pass, taking a first set of half-frame exposures, as illustrated in FIG. 6. Thereafter, the film is rewound, and upon again assuring that take-up reel 8 and sprocket 7 are securely clutched, the free end of the film leader is attached to take-up reel 8, and the second designated sprocket hole 33 is engaged upon that sprocket tooth in alignment with mark 30. If required, prior to reloading of the film, it may be replaced in punch 34 and a portion of its leader tip cropped.

The film is thereafter advanced through the camera in its second pass, so as to complete exposure of the film as shown in FIG. 7. At that point, the film is rewound and set aside for processing and a new film may be prepared and loaded in the camera in the same manner just described.

Modifications may be made in the invention without departing from the spirit of it. For example, some formats do not lend themselves well to half-frame exposure. Under these circumstances, the opening 16 in mask 15 may be made any appropriate size, for example two-thirds of the normal format, or the like.

The mask 15 of the invention, alone or together with some or all of the punch 34, dry transfer reticle 49, and warning device 63, can be packaged as a kit for the conversion of any conventional camera. The kit will, of course, be supplied with complete instructions as to the installation and use of its various parts.

It is also within the scope of the invention to provide some sort of label, flag, shiftable sign or the like, settable by the operator at the time of each pass of the film through the camera, to indicate to the user that the film is within either its first or second pass through the camera.

The mask of the present invention could be made up of two separate pieces, spaced from each other by a distance equivalent to the width of opening 16. To strengthen the mask 15 of FIG. 2, the mask thickness above and below opening 16 could be increased, or a thin, transparent non-reflective membrane could be applied to a narrow portion of the lens side of the mask opening. As yet another alternative, that portion of the mask extending above film guide rails 10 and 11 could be increased in width. This extension's thickness would, of necessity, be limited to about 0.002 inch (2 mils). An anti-friction coating would materially aid here.

In those cameras wherein no pressure plate is provided, an additional surface can be provided, as a part of or separate from the mask, against which the mask can press the film for greater film stabilization and flatness. Alternatively, the mask may be bowed simply against the films own tension to accomplish these purposes.

The punch of FIG. 8 can be so configured as to crease the film leader at the position of the designated sprocket holes, rather than perforating the film.

Finally, for some film formats the principles of the present invention may be applied for more than two passes of the film through the camera.

I claim:

1. Apparatus for converting a conventional camera for making images on photographic film from its usual full-frame format to a smaller format, said camera being of the type having a body, a lens, a shutter, a conventional film advance apparatus for said full-frame format, and an aperture in said body determining said full-frame format, said apparatus comprising masking means mountable within said body between said aperture and said film, said masking means being so configured as to mask at least one portion of said aperture to reduce the size of the exposed image on said film each time said shutter is actuated during a first passage of said film through said camera by said film advance apparatus to provide a format reduced in size, with an unexposed area on said film between each of said exposed images equal in size to at least one of said exposed images and to be exposed by at least a second pass of said film through said camera by said film advance apparatus.

2. The structure claimed in claim 1, wherein said masking means is configured to mask quarter frame areas of said aperture to either side thereof, whereby to convert said full-frame format of said camera to a half-frame format.

3. The structure claimed in claim 1 wherein said mask comprises a unitary structure having an opening therein of such size and shape as to provide said reduced format.

4. The structure claimed in claim 1, wherein said camera includes a view finder assembly comprising a condensing lens and a focusing screen, and including means for applying to the underside of said focusing screen a reticle corresponding to said reduced format.

5. The structure claimed in claim 1, including means to apply indicia to the leader end of said film to enable proper indexing of said film in said camera to fully effect exposure of said film with images of said reduced format during said at least two passes of said film through said camera.

6. The structure claimed in claim 1, including means mountable within said camera body to give audible and tactile warning to aid in prevention of complete rewind of the leader end of said film within its casette.

7. The structure claimed in claim 2, wherein said mask comprises a unitary structure having an opening therein of such size and shape as to provide a half-frame format.

8. The structure claimed in claim 3, wherein that surface of said mask facing said lens is treated to be both black and non-relfective.

9. The structure claimed in claim 3, wherein that surface of said mask facing said lens is treated to have an average reflectance approximating that of the emulsion side of said film used.

10. The structure claimed in claim 3, including means to removably mount said mask within said camera body.

11. The structure claimed in claim 3, wherein said camera includes a pressure plate, said mask being made of resilient material, said mask being so configured as to bias said film against said pressure plate to stabilize said film and to improve image sharpness.

12. The structure claimed in claim 7, wherein that surface of said mask facing said lens is treated to be both black and non-reflective.

13. The structure claimed in claim 7, wherein that surface of said mask facing said lens is treated to have an average reflectance approximating that of the emulsion side of said film.

14. The structure claimed in claim 7, including means to removably mount said mask within said camera body.

15. The structure claimed in claim 7, wherein said camera includes a pressure plate, said mask being made of resilient material, said mask being so configured as to bias said film against said pressure plate to stabilize said film and to improve image sharpness.

16. The structure claimed in claim 7, wherein said camera includes a view finder assembly comprising a condensing lens and a focusing screen, and including means for applying to the underside of said focusing screen a reticle corresponding to said reduced format.

17. The structure claimed in claim 7, including means to apply indicia to the leader end of said film to enable proper indexing of said film in said camera to fully expose said film with images of said reduced format during said at least two passes of said film through said camera.

18. The structure claimed in claim 7, including means mountable within said camera body to give audible and tactile warning to aid in prevention of complete rewind of the leader end of the film within its casette.

19. A method of converting a conventional camera for making images on photographic film from its usual full-frame format to a smaller format, said camera being of the type having a body, a lens, a shutter and an aperture in said body determining said full-frame format, said method comprising the steps of providing a masking means configured to mask at least one portion of said camera aperture to reduce the size of the exposed images on said film, affixing said masking means within said camera body at a position therein between said camera aperture and said film to be loaded therein, assuring that the film advancing train is securely clutched, marking the film leader at first and second positions thereon with the first position being nearest the free end of the leader and the second position being spaced from the first position by a distance equal to the width of said smaller format, selecting a registration point within said camera body, loading said film in said camera body with said first designated position on said film leader aligned with said registration point in said camera body, advancing said film through said camera in a first pass making a first series of exposures spaced from each other along the film, rewinding the film, assuring for a second time that the camera advancing train is securely clutched, reloading said film in said camera body with said second designated position on said film leader aligned with said registration point in said camera body, advancing said film through said camera in a second pass making a second series of exposures interdigitated between said first set of exposures and again rewinding said film for processing.

20. The method claimed in claim 19 wherein said smaller format is a half-frame format.

21. The method claimed in claim 19 wherein said film is conventional 35 mm film and said smaller format is a half-frame format, said film having sprocket holes therein and said camera advancing train comprising a take-up reel and a camera sprocket guide roll, said first and second positions on said film leader corresponding respectively to first and second sprocket holes on said leader separated from each other by three intervening sprocket holes, and including the steps of engaging said first sprocket hole on that sprocket tooth of said camera sprocket guide roller aligned with said registration point in said camera body after assuring that said sprocket guide roller and said take-up reel are securely clutched for said first pass of said film and engaging said second sprocket hole on that sprocket tooth of said camera sprocket guide roller aligned with said registration point in said camera body after again assuring that said sprocket guide roller and said take-up reel are securely clutched for said second pass of said film.

22. A film stabilizing and flattening means for use with a camera for making images on conventional roll-type photographic film, said camera being of the type having a body, a first aperture-window in said body, a springloaded pressure plate partially countering the tendency of said film to curl in both longitudinal and transverse planes, while also comprising the rear surface of a channel guiding the travel of said film through said body, a film supply reel and a film take-up reel, plus means to transfer said film from said supply reel to said take-up reel, thereby effecting transportation of said film through said camera body, past said first aperture-window and over said pressure plate, said film stabilizing and flattening means comprising a mask-stabilizer mountable within said camera body between said first aperture-window and said film, said mask-stabilizer being made of flexible material, said mask-stabilizer having a second aperture-window therein, one of said first and second aperture-windows determining the size of the exposed image on said film, at least that portion of said mask-stabilizer containing said second aperture-window being so bowed as to bias said film against said pressure plate along all four sides of said second aperture-window whereby to materially aid both static and dynamic stability of said film at the image-plane and beyond, along that length of said film extending from said image-plane to said film take-up reel.

23. A method of stabilizing and flattening conventional roll-type photographic film in a camera for making images on said photographic film, said camera being of the type having a body a first aperture-window in said body, a spring-loaded pressure plate partially countering the tendency of said film to curl in both longitudinal and transverse planes, while also comprising the rear surface of a channel guiding the travel of said film through said body, a film supply reel and a film take-up reel, plus means to transfer said film from said supply reel to said take-up reel, thereby effecting transportation of said film through said camera body, past said first aperture-window and over said pressure plate, said film stabilizing and flattening method comprising the steps of providing a mask-stabilizer made of flexible material and having a second aperture-window therein, one of said first and second aperture-windows determining the size of the exposed image on said film, locating said mask-stabilizer within said camera body between said first aperture-window and said film, bowing or flexing at least that portion of said mask-stabilizer containing said second aperture-window so as to bias said film against said pressure plate along all four sides of said second aperture-window, so as to materially aid planar constraint of said film at the image-plane during intermittent operation, while simultaneously providing dynamic stabilization during rapidily sequenced manual and motor-driven exposures, especially along that length of said film extending from said image-plane to said film take-up reel.

* * * * *